United States Patent [19]

Izumi et al.

[11] 4,407,186
[45] Oct. 4, 1983

[54] FLOW OUTLET STRUCTURE FOR AUTOMOTIVE AIR CONDITIONER

[75] Inventors: Masao Izumi; Hideki Maruyama, both of Fujisawa; Hiroshi Yoshida, Zama, all of Japan

[73] Assignee: Nissan Motor Company, Ltd., Yokohama, Japan

[21] Appl. No.: 250,939

[22] Filed: Apr. 6, 1981

[30] Foreign Application Priority Data

Apr. 7, 1980 [JP] Japan .......................... 55-46769[U]

[51] Int. Cl.³ .............................................. B60H 1/00
[52] U.S. Cl. .................................... 98/2; 98/40 VM; 98/121 A; 137/832
[58] Field of Search ................ 98/2.01, 2, 2.11, 40 E, 98/40 V, 40 VM, 41 AV, 107, 110, 121 A; 137/832; 236/80 D

[56] References Cited

U.S. PATENT DOCUMENTS

| | | | |
|---|---|---|---|
| 2,817,282 | 12/1957 | Dolison | 98/2.11 |
| 2,894,441 | 7/1959 | Boylan | 98/40 VM X |
| 2,969,725 | 1/1961 | Grace et al. | 98/40 VM X |
| 2,987,981 | 6/1961 | Boylan | 98/110 X |
| 3,176,603 | 4/1965 | O'Day et al. | 98/40 V |
| 3,456,574 | 7/1969 | Jakeway | 98/40 VM X |
| 3,521,653 | 7/1970 | Becker et al. | 137/832 X |
| 3,521,654 | 7/1970 | Brautaset et al. | 137/832 X |
| 3,701,311 | 10/1972 | McLarty | 98/110 |
| 3,942,559 | 3/1976 | Kranz et al. | 137/832 X |
| 3,996,845 | 12/1976 | Harris | 98/110 X |

*Primary Examiner*—William E. Tapolcai
*Attorney, Agent, or Firm*—Schwartz, Jeffery, Schwaab, Mack, Blumenthal & Koch

[57] ABSTRACT

A flow outlet structure for an automotive air conditioner which is equipped with a louver having a plurality of movable slats and a fluidic element to cyclically change the direction of flow laterally of the automobile as long as the angle of the slats of the louver are below a predetermined angle. When the slats of the louver takes an angular position greater than the predetermined angle, the flow of cool air in three diversified directions is provided.

6 Claims, 10 Drawing Figures

FLOW OUTLET STRUCTURE FOR AUTOMOTIVE AIR CONDITIONER

BACKGROUND OF THE INVENTION

1. Field of the Invention

The present invention relates to a flow outlet structure for an automotive air conditioner, and more particularly to a flow outlet structure equipped with a device using a fluidic element to cyclically change the direction of cool air flowing out of the outlet.

2. Description of the Prior Art

A close relationship is found to exist between the direction of cool air flowing out of a flow outlet structure for an air conditioner and the temperature distribution within the interior of a room. This relationship is notable in the case that the interior of a room, such as the interior of an automobile, is narrow and subjected to the solar radiation.

A flow outlet structure for an air conditioner is known having a device using a fluidic element to cyclically change the direction of cool air flowing out of the outlet structure. An automobile using a plurality of such flow outlet structures is known wherein the flow outlet structures are arranged in an instrument panel disposed at the front of the interior of the automobile to cyclically change the direction of cool air to the left and right.

With this known arrangement, wherein each of the flow outlets are pivoted to the instrument panel to assume any desired angle in a vertical direction, the flow outlets are so adjusted as to direct cool air toward the body of a seat occupant whenever hot air is confined within the interior of the automobile or the interior of the automobile is subjected to solar radiation. However, the seat occupant feels uncomfort when there is no heat source causing a partial rise in temperature within the interior of the automobile and the flow of cool air is directed to come into contact with his or her body. Therefore, under circumstances when there is no heat source causing a partial rise in temperature within the interior of the automobile such as when the automobile is used during cloudy day or during a night, the seat occupant adjusts the angle of each of the flow outlets so as to direct the flow of cool air upwardly toward the ceiling of the interior.

If the flow outlets are angled upwardly and the quantity of cool air is increased, all of the cool air flows along the ceiling to reach the rear seat, resulting in an excessive drop in temperature in the rear seat. This is because the velocity of the flow of cool air increases if the quantity of cool air is to be increased. If, for the purpose of avoiding the above phenomenon, the quantity of cool air is decreased, the velocity of cool air drops so that cool air does not reach the rear seat.

Thus, the known flow outlet structure does not accomplish even distribution of temperature, providing an uncomfortable feeling to the seat occupant particularly the passenger in the rear seat.

SUMMARY OF THE INVENTION

For the purpose of avoiding the above drawback, it is desired that the velocity of cool air is held to a low level without any considerable reduction in quantity of cool air and at the same time, the cool air is allowed to extend over a wide range.

After a series of various kinds of tests with due consideration of the property of a fluidic element, it has been found that adjusting the movable slats of a louver to take an angular position above a predetermined angle causes the cyclic change in the direction of cool air to cease and causes creation of a phenomenon that, without any reduction in the quantity of cool air, the cool air extends over a wide range.

According to the present invention, an flow outlet structure comprises means, including a fluidic element, for cyclically changing the direction of flow of cool air and a louver including a plurality of parallel pivotable slats.

It is therefore an object of the present invention to provide a flow outlet structure which is effective in practical use and which is free from the before-mentioned drawback.

BRIEF DESCRIPTION OF THE DRAWINGS

The present invention is further described hereinafter in connection with the accompanying drawings, in which.

DETAILED DESCRIPTION OF THE INVENTION

Figure 1:
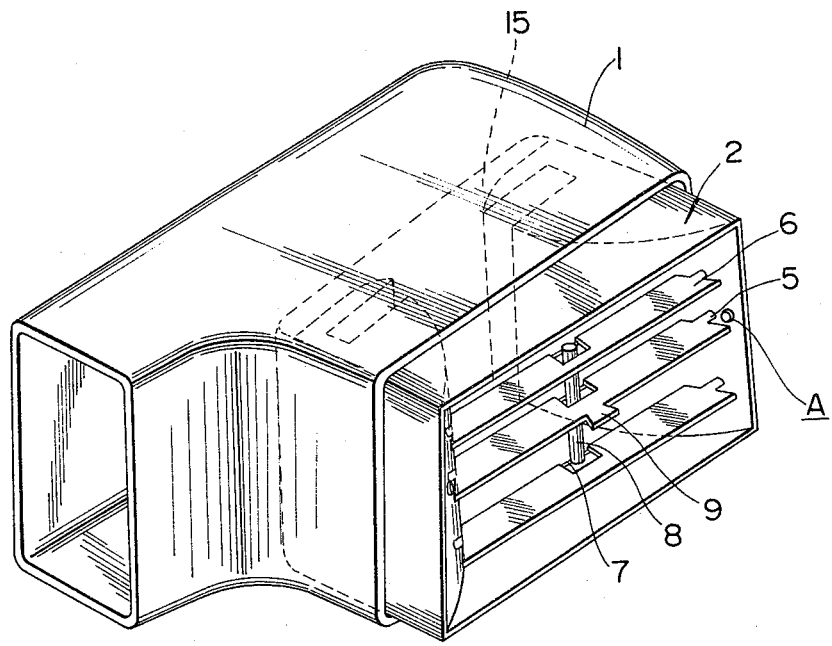
FIG. 1 is a perspective view of a flow outlet structure for an automotive air conditioner according to the present invention.
Figure 2:
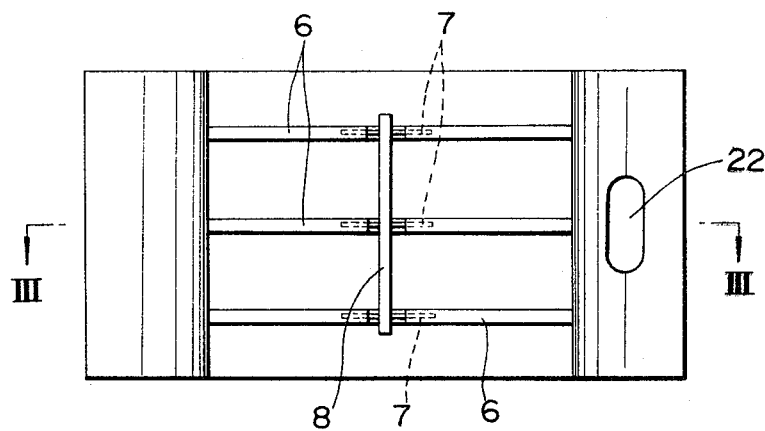
FIG. 2 is a rear view of the flow outlet structure.
Figure 3:
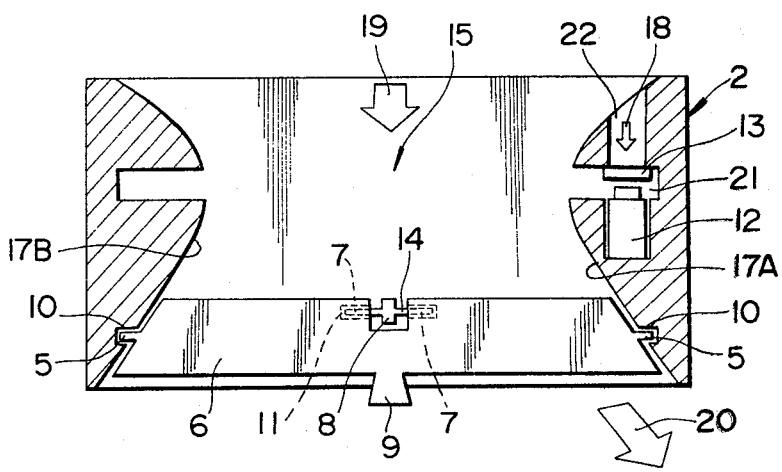
FIG. 3 is a sectional view taken through the line III—III in FIG. 2.
Figure 4:
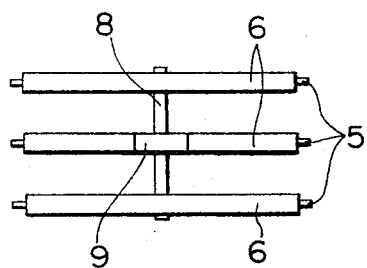
FIG. 4 is a plan view of a slat assembly of the louver.
Figure 5:
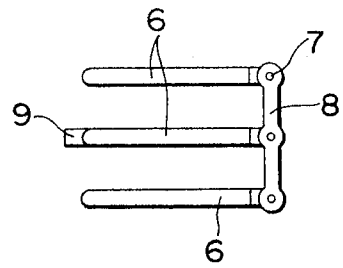
FIG. 5 is a side view of the slat assembly.
Figure 6:
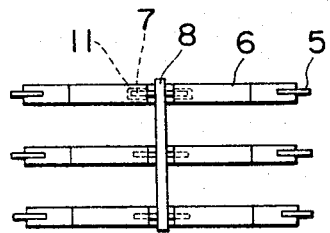
FIG. 6 is a rear view of the slat assembly.
Figure 7:
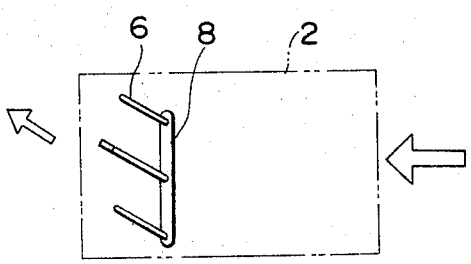
FIG. 7 is a diagram used to explain the operation of the slat assembly.

Referring to the accompanying drawings, a preferred embodiment according to the present invention is described, wherein 1 denotes a duct establishing connection between an air conditioner (not illustrated) and an air outlet 2. The air outlet 2 utilizes the principles of a fluidic element. Accommodated within the air outlet 2 is a solenoid 12 cooperating with a flap 13 for closing and opening a control flow 18. On the downstream end of each of right and left side walls 17, there are formed a plurality of slots for rotatably receiving projections on one end of each of movable slats 6.

The plurality of movable slats 6 are interconnected by a single link rod 8 so that all of the movable slats 6 are inclined in the same direction upwardly or downwardly.

The link rod 8 engages with respective movable slats 6 at their center portions. That is each of the movable slats 6 has a center portion formed with a U-shaped cutout 14 whose opposite side surfaces are formed with two opposite slots 11, respectively, to receive a coupling pin 7 integrally formed with the link rod 8. 9 denotes a knob integrally formed with one of the slats 6 for manipulating the movable slats 6. The reference character A denotes a marker in the form of a small projection disposed on the side wall 17 such that if the slats 6 have been angled through a predetermined angle one of the slats 6 comes into abutting contact with the small protrusion A. Further rotation of the slats 6 in the same direction with the manipulating knob 9 causes the slats 6 to ride over the small protrusion A.

15 denotes a main air flow passage, 19 denotes a main air flow, 20 denotes a flow of cool air as flowing out of the louver, 21 denotes a control port, and 22 a control air flow passage.

The operation of the above embodiment is explained.

Figure 8:
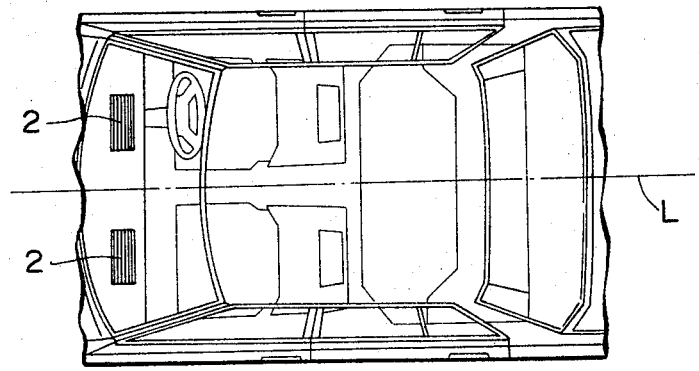
FIG. 8 is a diagram showing an arrangement using the flow outlet structure within the interior of an automobile.
Figure 9:
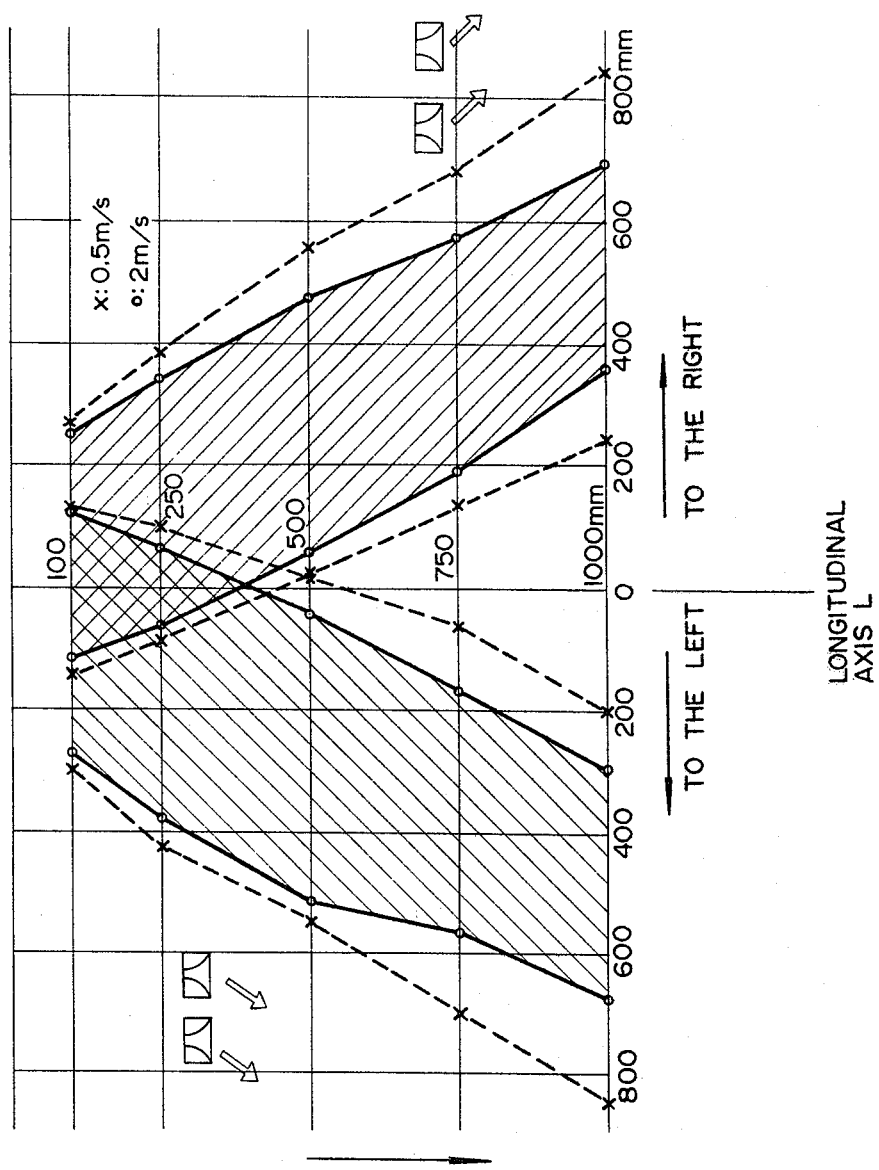
FIG. 9 is a graph showing a flow pattern when the slats of the louver are angled smaller than a predetermined angle.

The main fluid flow delivered through the duct 1 is deflected in response to open state or closed state of the flap 13. It flows along the opposite side wall 17B when the valve seat 13 is in the open state because a branched portion of the air flow passes through the control air flow passage 22 and blows out of the control port 21, while, when the flap 13 is in the closed state, the cool air is deflected to flow along the side wall 17A near the valve seat 13 because the path of the flow through the main air flow passage 15 causes creation of a vacuum within the control port 21.

Where the air outlets 2 are mounted in the instrument panel of an automobile having a longitudinal axis L as shown in FIG. 8 and slats 6 of each louver are set horizontally, cool air is deflected rightwardly or leftwardly in response to the on-off frequency of the solenoid 12, thus providing a velocity distribution as shown in FIG. 9. Referring to the frequency of the cyclic deflection of the cool air, the duration time for one of the directions of air may be elongated by changing the duty ratio of on and off of the solenoid 12. Under this circumstance, the flow of cool air is directed into contact with the body of a front seat occupant and provides substantially even temperature distribution within the interior of the automobile. This state of use is suitable for the case when the front seat occupant desires cool air when hot air is confined within the interior of the automobile or the interior of the automobile is subjected to solar radiation.

When it is desired to maintain the temperature within the interior of the automobile uniform or equal without any cool air contacting directly with the front seat occupant, the slats 6 of the louver are rotatably moved by manipulating the knob 9 upwardly until one of the slats 6 of the louver has ridden over the small protrusion A.

Figure 10:
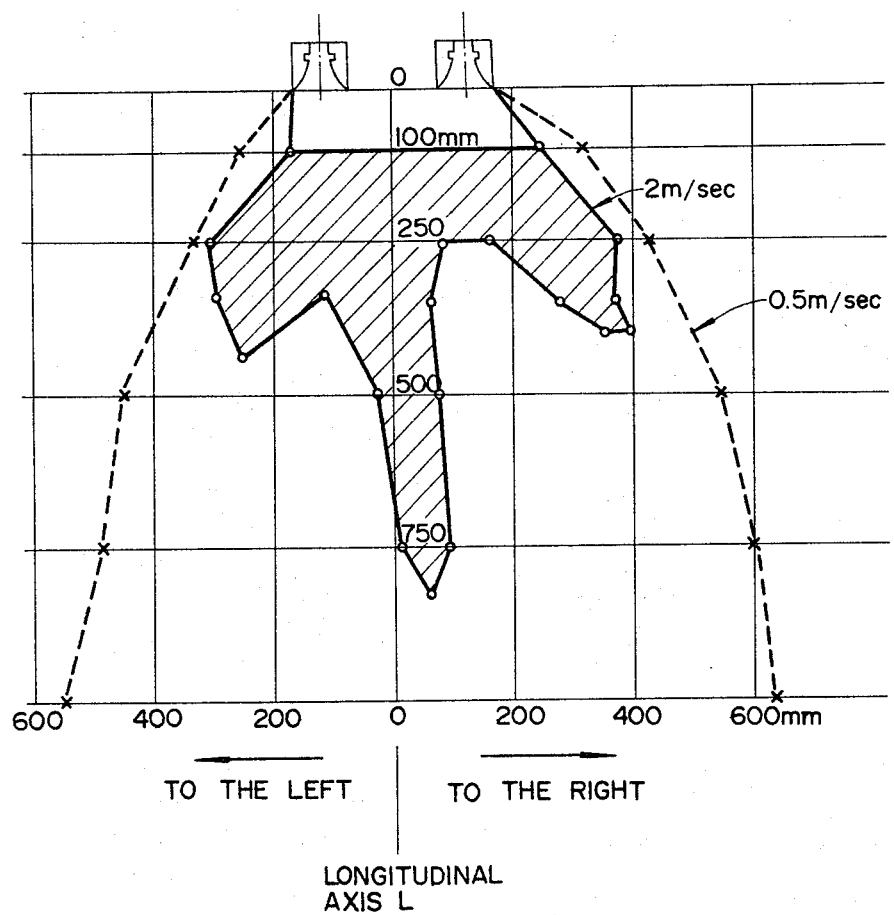
FIG. 10 is a similar graph to FIG. 9 showing a flow pattern when the slats of the louver are angled greater than the predetermined angle.

According to the experiment conducted by the inventors, with the flow outlet which measures 60 mm by 110 mm and 60 mm in inward distance and which has three slats each having 2 mm in thickness, the small protrusion A is disposed such that the slat of the louver contacts with the protrusion A when it has moved through an angle ranging from 20° to 30° and preferably in the neighbourhood of 25°. Where the angle of the slats 6 of the louver is at an angular position right after having ridden over the small protrusioj A, cool air flowinc out ob the flow outlets shows a pattern as shown in FIG. 10 wherein in addition to deflected left and right flows, there occurs a straight center flow having substantially the same velocity as that of the deflected flows. It is deemed that because of an increase in outlet flow resistance, the deflecting effect by the fluidic element is partly neglected to allow the occurrence of the central undeflected flow.

In this state of use, cool air flows out of the outlet in three distributed directions and a reduction in velocity of air is accomplished without any reduction in quantity of flow, preventing an excessive cooling of the rear seat, thus providing uniform or equal distribution of the temperature.

In this manner, since within the range where the slats of the louver are deflected less than the predetermined angle, there exists cyclic deflection of flow leftwardly and rightwardly, while, within the angle above the predetermined angle, the cyclic deflection ceases and a central flow in addition to the two deflected left and right flows is obtained. Thus, it will be appreciated that an unexpected result exists.

In practical use, a marker is provided so as to make clear the distinction between the two different states of use each described above. Although, in the preferred embodiment, the marker takes the form of the small protrusion, other measure such as a coloured marker may be employed.

What is claimed is:

1. A flow outlet structure for an automotive air conditioner, comprising:
    a duct having one end communicable with said air conditioner to receive conditioned air therefrom, and an opposite end;
    an air outlet coupled with the opposite end of said duct, said air outlet including a fluidic element means having a solenoid valve for urging the flow of conditioned air passing through said air outlet to deflect in a first direction when said solenoid valve is energized and in a second direction when said solenoid valve is not energized; and
    a louver fitted in the outlet opening and having a plurality of parallel pivotable slats for swingable movement in a direction normal to said first and second directions, said plurality of slats being disposed at a downstream end of said air outlet with respect of the flow of conditioned air.

2. A flow outlet structure as claimed in claim 1, including a marker means for notifying an operator that said slats have been pivoted through a predetermined angle.

3. A flow outlet structure as claimed in claim 2, wherein said marker means comprises a protrusion.

4. A flow outlet structure as claimed in claim 1, wherein said air outlet comprises a main air flow passage, and said fluidic element means comprises a control air flow passage communicating with a control port, said control port being disposed at an angle with respect to said main air flow passage, and wherein said solenoid valve is positioned to open or close communication between said control air flow passage and said control port.

5. A flow outlet structure as claimed in claim 4, wherein said control port is disposed transversely to said main air flow passage.

6. A flow outlet structure as claimed in claim 5, wherein said control air flow passage is disposed parallel to said main air flow passage.

* * * * *